United States Patent [19]

Baumann et al.

[11] 4,166,068

[45] Aug. 28, 1979

[54] β,β-DICYANO STYRENES

[75] Inventors: Werner Baumann, Basel; Ulrich Zirngibl, Oberwil, both of Switzerland

[73] Assignee: Sandoz Ltd., Basel, Switzerland

[21] Appl. No.: 569,163

[22] Filed: Apr. 18, 1975

[30] Foreign Application Priority Data

Apr. 25, 1974 [CH] Switzerland .......................... 5658/74

[51] Int. Cl.$^2$ ........................................... C07C 143/68
[52] U.S. Cl. ............................. 260/456 A; 260/319.1; 260/326.62; 260/465 E; 544/106; 544/124; 8/54.2; 8/179; 546/230; 546/189; 546/208; 546/165; 546/166
[58] Field of Search .................................... 260/456 A

[56] References Cited

U.S. PATENT DOCUMENTS

| 3,221,041 | 11/1965 | Roland | 260/456 A |
|---|---|---|---|
| 3,349,098 | 10/1967 | Straley et al. | 260/326 C |
| 3,890,364 | 6/1975 | Knupfer et al. | 260/456 A |
| 3,927,063 | 12/1975 | Peter et al. | 260/456 A |

FOREIGN PATENT DOCUMENTS

| 1259206 | 1/1972 | United Kingdom | 260/464 |
|---|---|---|---|
| 1272269 | 4/1972 | United Kingdom | 260/456 A |
| 1378446 | 12/1974 | United Kingdom | 260/464 |

Primary Examiner—Nicky Chan
Attorney, Agent, or Firm—Gerald D. Sharkin; Richard E. Vila; Thomas C. Doyle

[57] ABSTRACT

The present invention relates to para-substituted-amino-β,β-dicyano styryl disperse dye compounds having an acyloxy group in an ortho position to the methine group.

20 Claims, No Drawings

β,β-DICYANO STYRENES

IMPROVEMENTS IN OR RELATING TO ORGANIC COMPOUNDS

The present invention relates to styryl compounds, their production and use.

In particular, the present invention provides disperse dyes being para-substituted-amino-(β,β-dicyano)styryl compounds which have an acyloxy group in an ortho position to the methine group.

By 'acyl' is meant $(C_{1-6})$ alkoxycarbonyl, chloro- or bromo $(C_{1-6})$ alkoxycarbonyl, $(C_{1-6})$ alkoxy $(C_{2-6})$-alkoxycarbonyl, phenyl $(C_{1-6})$ alkoxycarbonyl, phenoxycarbonyl, $(C_{1-6})$ alkylsulphonyl, $(C_{5-6})$ cycloalkylsulphonyl, phenyl $(C_{1-6})$ alkylsulphonyl, $(C_{1-6})$ alkyl- or di- $(C_{1-6})$ alkylamino-carbonyl, $(C_{1-6})$ alkyl- or di- $(C_{1-6})$ alkylaminosulphonyl, N-$(C_{1-6})$ alkyl-N-phenylamino-carbonyl or-sulphonyl, and radicals of formula

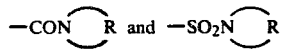

in which R signifies the atoms necessary to form, with the nitrogen atom, a morpholine, thiomorpholine, pyrrolidine or piperidine ring,
any phenyl moiety in such radicals being unsubstituted, monosubstituted by ethoxy or substituted by up to two substituents selected from the group consisting of chlorine, bromine, methyl and methoxy. Acyloxy is to be understood accordingly.

Apart from the acyloxy group ortho to the methine group, the benzene nucleus may be further substituted. Any substituents on the amino group in the compounds of the invention are preferably unsubstituted or substituted alkyl or cycloalkyl or are such as to form, together with the nitrogen atom, a hetrocyclic ring. As will be appreciated, the substituents will be so chosen as not deleteriously to affect the compounds' utility as disperse dyes, particular examples of suitable substituents being hereinafter given.

More particularly the present invention provides compounds of formula I,

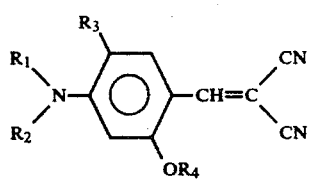

in which
$R_1$ signifies $(C_{1-6})$ alkyl or $(C_{5-6})$ cycloalkyl,
$R_2$ signifies $(C_{1-4})$ alkyl; or $(C_{1-4})$ alkyl monosubstituted by chlorine, bromine, phenyl, phenoxy, $(C_{1-4})$ alkoxy, $(C_{1-4})$alkoxycarbonyl, $(C_{1-4})$alkylcarbonyloxy, $(C_{1-4})$ alkoxycarbonyloxy or benzoyloxy,
or $R_1$ and $R_2$, together with the nitrogen atom to which they are bound, form a pyrrolidine, piperidine or morpholine ring, and
$R_3$ signifies hydrogen,
or $R_3$,together with $R_1$ forms a pyrrolidine or piperidine ring,
$R_4$ signifies $(C_{1-6})$alkoxycarbonyl, chloro $(C_{1-6})$alkoxycarbonyl, bromo $(C_{1-6})$alkoxycarbonyl, $(C_{1-4})$ alkoxy $(C_{2-6})$ alkoxycarbonyl, benzyloxycarbonyl, phenoxycarbonyl, $(C_{1-6})$ alkylsulphonyl, $(C_{5-6})$ cycloalkylsulphonyl, benzylsulphonyl, di$(C_{1-4})$alkylaminocarbonyl, N-$(C_{1-4})$ alkyl-N-phenylaminocarbonyl, di-$(C_{1-4})$ alkylaminosulphonyl, N-$(C_{1-4})$ alkyl-N-phenylaminosulphonyl or

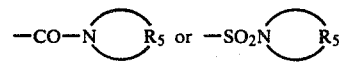

in which $R_5$ signifies the atoms necessary to form a pyrrolidine, piperidine or 4-morpholine ring,
any phenyl moiety in such substituents $R_2$ and $R_4$ being unsubstituted or substituted by up to two substituents selected from the group consisting of chlorine, bromine, methyl and methoxy or monosubstituted by ethoxy, compounds in which such phenyl moiety or moieties are unsubstituted being preferred.

Any alkyl radical as $R_1$ is preferably $(C_{2-4})$ alkyl, in particular ethyl. Preferably, $R_1$ signifies alkyl.

Any substituted alkyl as $R_2$ is preferably monosubstituted by chlorine, bromine, methoxy, ethoxy, phenyl, phenoxy, acetoxy, propionyloxy, $(C_{1-4})$alkoxycarbonyl or $(C_{1-4})$alkoxycarbonyloxy.

Any substituted or unsubstituted alkyl radical as $R_2$ is preferably $C_{2-4}$, in particular ethyl, except where $R_2$ is alkyl substituted by phenyl where such alkyl radical preferably contains 1 to 4, more preferably 1 or 2 carbon atoms.

$R_2$ is preferably an unsubstituted or substituted alkyl radical. More preferably $R_2$ is $(C_{2-4})$alkyl; $(C_{2-4})$ alkyl monosubstituted by chlorine, bromine, methoxy, ethoxy, phenyl, phenoxy, acetoxy, propionyloxy, $(C_{1-4})$ alkoxycarbonyl or $(C_{1-4})$ alkoxycarbonyloxy; or benzyl. Even more preferably $R_2$ is $(C_{2-4})$ alkyl, especially ethyl, which is unsubstituted or monosubstituted by acetoxy, propionyloxy, methoxycarbonyl, ethoxycarbonyl, methoxycarbonyloxy or ethoxycarbonyloxy. Most preferably $R_2$ signifies unsubstituted $(C_{2-4})$ alkyl, especially ethyl.

$R_3$ is preferably hydrogen.

Any alkoxycarbonyl or alkylsulphonyl radicals as $R_4$ preferably contain up to 4 carbon atoms and any cycloalkyl radical is preferably cyclohexyl.

Preferably $R_4$ signifies $(C_{1-4})$ alkoxycarbonyl, chloroethoxycarbonyl, bromoethoxycarbonyl, methoxyethoxycarbonyl, ethoxyethoxycarbonyl, dimethyl- or diethylaminocarbonyl, benzyloxycarbonyl, $(C_{1-4})$ alkylsulphonyl, $(C_{5-6})$ cycloalkylsulphonyl, dimethyl- or diethylaminosulphonyl, benzylsulphonyl, piperidinocarbonyl, morpholinocarbonyl, pyrrolidinocarbonyl, piperidinosulphonyl, phenoxycarbonyl, morpholinosulphonyl or pyrrolidinosulphonyl. More preferably, $R_4$ signifies $(C_{1-2})$ alkoxycarbonyl, benzyloxycarbonyl, phenoxycarbonyl, $(C_{1-4})$ alkylsulphonyl, cyclohexylsulphonyl, benzylsulphonyl, piperidinocarbonyl, pyrrolidinocarbonyl, morpholinocarbonyl, morpholinosulphonyl, pyrrolidinosulphonyl, piperidinosulphonyl or dimethyl-or diethylaminocarbonyl or -sulphonyl. Even more preferably, $R_4$ signifies $(C_{1-4})$ alkylsulphonyl, benzylsulphonyl or cyclohexylsulphonyl, with $(C_{1-4})$ alkyl sulphonyl being most preferred.

Preferred compounds of formula I are those of formula Ia,

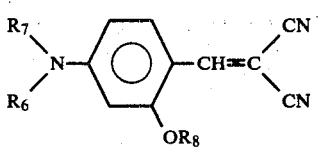

in which
- $R_6$ signifies $(C_{2-4})$ alkyl,
- $R_7$ signifies $(C_{2-4})$ alkyl which is unsubstituted or monosubstituted by $(C_{1-2})$ alkylcarbonyloxy, $(C_{1-2})$alkoxycarbonyl or $(C_{1-2})$alkoxycarbonyloxy, and
- $R_8$ signifies $(C_{1-2})$ alkoxycarbonyl, benzyloxycarbonyl, phenoxycarbonyl, $(C_{1-4})$ alkylsulphonyl, cyclohexylsulphonyl, benzylsulphonyl, piperidinocarbonyl, morpholinocarbonyl, pyrrolidinocarbonyl, pyrrolidinosulphonyl, piperidinosulphonyl, morpholinosulphonyl, di- $(C_{1-2})$ alkylaminocarbonyl or di- $(C_{1-2})$ alkylaminosulphonyl.

More preferred compounds of formula I are those of formula Ib,

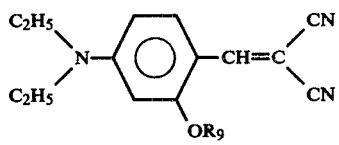

in which
- $R_9$ signifies $(C_{1-4})$ alkylsulphonyl, cyclohexylsulphonyl or benzylsulphonyl.

The present invention also provides a process for the production of para-substituted-amino-($\beta,\beta$-dicyano) styryl compounds of the present invention, as defined above, comprising condensing the corresponding aminobenzaldehyde or a $(C_{1-4})$alkylimino or quaternated $(C_{1-4})$ alkylimino derivative thereof with malonic acid dinitrile, preferably in a 1:1 molar ratio. For example the compounds of formula I, can be prepared by condensing a compound of formula II,

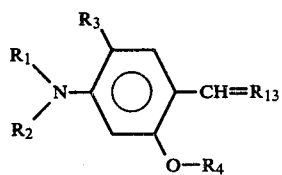

in which
- $R_1$ to $R_4$ are as defined above,
- $R_{13}$ is oxygen, $=NR_{14}$ or $=NR_{14}R_{15}$ in which $R_{14}$ is $(C_{1-4})$alkyl, and $R_{15}$ is $(C_{1-4})$alkyl or phenyl, with malonic dinitrile.

The condensation reaction may be effected using Knovenagel conditions. Suitably, the reaction is conducted in the presence of an organic base in an inert protic, preferably anhydrous,solvent. Suitable solvents include ethanol and methanol.

As examples of suitable organic bases may be given piperidine, pyrrolidine, pyridine, triethylamine and triethanolamine.

The reaction is suitably conducted at a temperature in the range of from 50° to 150° C., preferably at the boiling point of the solvent used. The compounds according to the invention usually precipitate during the reaction or on cooling; if not they may be obtained by concentrating, cooling and filtering.

Preferably, malonic acid dinitrile is condensed with the corresponding benzaldehyde.

The starting materials are produced in accordance with known methods from available starting materials, for example by condensing the corresponding 3-aminophenols with an acid anhydride or chloride and forming the aldehyde employing Vilsmeyer reaction conditions.

The compounds according to the invention are disperse dyes and may be used to dye substrates consisting of or comprising semi-synthetic or synthetic, hydrophobic, high-molecular weight organic substances. Examples of suitable substrates which may be dyed are those consisting of or comprising linear aromatic polyesters, cellulose 2½ acetate, cellulose triacetate and synthetic polyamides.

The compounds according to the invention may be converted into disperse dyeing preparations according to conventional methods, for example by grinding in the presence of dispersing and/or filling agents, and optionally dried in a vacuum or by spraying. The preparations may be used as such, or after the addition of water, for pad dyeing,exhaust dyeing or printing from a long or short bath. Dyeing or printing may be carried out in accordance with known methods.

The compounds of formula I, as defined above are also suitable for the so called heat transfer printing process of textiles. In which case, the compounds of formula I are formulated into suitable printing inks or pastes in known manner and are printed onto a temporary support e.g. paper, for application to the desired substrate in conventional manner. Suitable substrates which may be printed by the transfer printing process include linear,aromatic polyesters, cellulose 2½ acetate, cellulose triacetate and synthetic polyamides.

The dyeings obtained have especially notable light fastness. They also have notable wash, perspiration and rubbing fastness. The dyes are resistant to the effect of reduction when dyeing polyester-wool blends. The dyes reserve wool and cotton and possess notable levelling and thermomigration properties.

The following Examples further served to illustrate the invention. In the Examples all parts are by weight and all temperatures in degrees Centigrade.

EXAMPLE 1

15 Parts 2-n-butyl-sulphonyloxy-4N,N-diethylaminobenzaldehyde, 3.2 parts malonic acid dinitrile and 0.1 parts piperidine are dissolved in 20 parts anhydrous ethanol, brought to the boil over the course of 2 hours under reflux,and subsequently allowed to cool to room temperature. The condensation product of formula

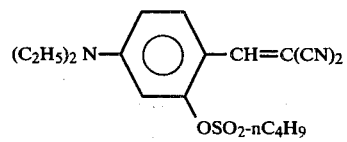

is filtered off and washed with a little methanol. After re-crystallisation from an n-butanol/benzene mixture, yellow crystals with a melting point of 104°–106° are obtained.

2-n-butyl-sulphonyloxy-4-N,N-diethylamino-benzaldehyde can be produced as follows:

40 Parts dimethyl formamide are cooled to 0°, 21 parts phosphorus oxychloride are added with cooling over the course of 30 minutes and the mixture is then stirred for 30 minutes at 0°. A solution of 39 parts 3-n-butylsulphonyloxy-N,N-diethylaniline in 10 parts dimethyl formamide is added thereto over a period of 15 minutes, the reaction mixture is heated to 40° and kept at this temperature for 5 hours. The reaction mixture is then discharged into 900 parts of an ice/water mixture, adjusted to a pH of 5 with sodium acetate and stirred overnight at room temperature. Subsequently, it is taken up in an ethyl acetate/diethyl ether mixture, separated from the aqueous phase, washed out with distilled water, dried over $Na_2SO_4$ and freed from solvent by evaporation.

3-n-butyl-sulphonyloxy-N,N-diethyl aniline can be produced as follows:

A solution of 50 parts 3-N,N-diethylaminophenol in 80 parts acetone and 200 parts water is adjusted to a pH of 12 with sodium hydroxide. A solution of 52 parts n-butane-sulphonyl chloride in 260 parts acetone is then added, with stirring, over the course of 1 hour whilst keeping the pH constant by the addition of NaOH and ensuring that the temperature does not rise above 30°. After stirring for a further hour at room temperature, the reaction mixture is divided between diethyl ether and water; the organic phase is washed out with dilute sodium hydroxide and with water, dried over $Na_2SO_4$ and evaporated. The residue is distilled in a vacuum.

The following Table shows other dyes of formula I which can be produced in a similar way to that described in the above Example. The shade obtained with these dyes on polyester fibre material is greenish-yellow.

TABLE

| Example No. | $R_2$ | $R_1$ | $R_3$ | $R_4$ |
|---|---|---|---|---|
| | ($R_1$ & $R_2$ are interchangeable when $R_3$ = H) | | | |
| 2 | $-C_2H_5$ | $-C_2H_5$ | H | $-SO_2CH_3$ |
| 3 | " | $-CH_2C_6H_5$ | | " |
| 4 | | $-C_2H_5$ | H | " |
| | cyclohexyl-H | | | |
| 5 | $-C_2H_5$ | " | H | $-CON(CH_3)_2$ |
| 6 | " | " | H | $-CON(C_2H_5)_2$ |
| 7 | " | $-CH_2-CH_2-CH_2-$ | | $-SO_2CH_3$ |
| 8 | " | " | H | $-SO_2-(CH_2)_3-CH_3$ |
| 9 | " | $-CH_2-CH_2-CH_2-$ | | $-SO_2-CH_3$ |
| 10 | " | $-CH_2CH_2-$ | | |
| 11 | $-CH_2CH_2-O-CH_2CH_2$ | | H | " |
| 12 | $-C_2H_5$ | $-CH_2CH_2Cl$ | H | $-SO_2N\underset{\diagdown}{\diagup}O$ (morpholino) |
| 13 | " | $-C_2H_5$ | H | $-SO_2N(CH_3)C_6H_5$ |
| 14 | " | " | H | $-CON(CH_3)C_6H_5$ |
| 15 | $-CH_2CH_2O-COOC_2H_5$ | " | H | $-COOC_2H_5$ |
| 16 | $-C_2H_5$ | " | H | $-SO_2-\text{cyclohexyl-H}$ |
| 17 | " | " | H | $-SO_2-C_2H_5$ |
| 18 | $-(CH_2)_2CH_3$ | " | H | " |
| 19 | " | $-(CH_2)_3CH_3$ | H | " |
| 20 | $-CH_2CH_2-C_6H_5$ | $-C_2H_5$ | H | " |
| 21 | $-CH_2CH_2-O-C_2H_5$ | " | H | " |
| 22 | $-CH_2CH_2-O-\overset{O}{\underset{\|}{C}}-CH_3$ | " | H | " |
| 23 | " | $-(CH_2)_3CH_3$ | H | " |
| 24 | $-CH_2-CH_2-CH_2-CH_2-CH_2-$ | | H | " |
| 25 | $-CH_2-CH_2-O-CH_2-CH_2-$ | | H | " |
| 26 | $-C_2H_5$ | $-C_2H_5$ | H | $-SO_2-(CH_2)_2CH_3$ |
| 27 | " | " | H | $-SO_2-(CH_2)_3CH_3$ |

| Example No. | $R_1$ | $R_2$ | $R_3$ | $R_4$ |
|---|---|---|---|---|
| 28 | $-C_2H_5$ | $-C_2H_5$ | H | $-SO_2-CH_2-CH{\diagup^{CH_3}_{\diagdown CH_3}}$ |
| 29 | " | " | H | $-SO_2-(CH_2)_4CH_3$ |
| 30 | " | " | H | $-SO_2-(CH_2)_5CH_3$ |
| 31 | " | " | H | $-SO_2-\text{cyclohexyl-H}$ |
| 32 | " | " | H | $-SO_2-CH_2C_6H_5$ |

TABLE-continued

| No. | | | | |
|---|---|---|---|---|
| 33 | " | " | H | $-SO_2-N(CH_3)_2$ |
| 34 | " | " | H | $-SO_2-N(CH_2CH_3)_2$ |
| 35 | " | " | H | $-SO_2-N\text{(piperidinyl)}$ |
| 36 | " | " | H | $-SO_2-N\text{(pyrrolidinyl)}$ |
| 37 | " | " | H | $-C(=O)-O-CH_3$ |
| 38 | " | " | H | $-C(=O)-O-CH_2CH_3$ |
| 39 | " | " | H | $-C(=O)-O-CH(CH_3)_2$ |
| 40 | " | " | H | $-C(=O)-O-CH_2-CH(CH_3)_2$ |
| 41 | " | " | H | $-C(=O)-O-CH_2-C_6H_5$ |
| 42 | " | " | H | $-C(=O)-O-C_6H_5$ |
| 43 | " | " | H | $-C(=O)-O-CH_2CH_2-Br$ |
| 44 | " | " | H | $-C(=O)-O-CH_2CH_2-OCH_3$ |
| 45 | " | " | H | $-C(=O)-N(CH_3)_2$ |
| 46 | " | " | H | $-C(=O)-N(C_2H_5)_2$ |
| 47 | " | " | H | $-C(=O)-N\text{(piperidinyl)}$ |
| 48 | " | " | H | $-C(=O)-N\text{(morpholinyl)}$ |
| 49 | " | $-(CH_2)_3CH_3$ | H | $-SO_2-CH_3$ |
| 50 | " | " | H | $-SO_2-N(CH_3)_2$ |
| 51 | " | " | H | $-C(=O)-N(CH_3)_2$ |
| 52 | $-(CH_2)_3CH_3$ | " | H | $-SO_2-CH_3$ |
| 53 | " | " | H | $-SO_2-N(CH_3)_2$ |
| 54 | $-C_2H_5$ | $-CH_2CH_2-C_6H_5$ | H | $-SO_2-CH_3$ |
| 55 | " | " | H | $-SO_2-N(CH_3)_2$ |
| 56 | " | $-CH_2CH_2-O-C_2H_5$ | H | $-SO_2-CH_3$ |
| 57 | " | " | H | $-SO_2-(CH_2)_3CH_3$ |
| 58 | " | $-CH_2CH_2-O-C(=O)-CH_3$ | H | $-SO_2-(CH_2)_3CH_3$ |
| 59 | " | " | H | $-SO_2-N(CH_3)_2$ |
| 60 | " | " | H | $-C(=O)-N(CH_3)_2$ |
| 61 | " | $-CH_2CH_2Br$ | H | $-SO_2(CH_2)_3CH_3$ |
| 62 | " | $-CH_2C_6H_5$ | H | $-SO_2C_2H_5$ |
| 63 | " | $-CH_2CH_2COOCH_3$ | H | $-SO_2N(CH_3)_2$ |

APPLICATION EXAMPLE A

10 Parts of the dye obtained in Example 1 are ground together with 10 parts dinaphthyl methane disulphonic acid sodium, 10 parts lignin sulphonic acid sodium, 30 parts water and 300 parts silica quartzite beads until the average diameter of the dye particles is less than 1μ. The suspension is then filtered off from the silica quartzite beads and spray-dried under mild conditions.

1.4 Parts of the dye preparation thus obtained are added to 4000 parts water in a dye bath at 60° which has been buffered to a pH of 5 and the mixture is stirred. 20 parts orthophenylphenol are added to the dyebath and 100 parts polyester fabric are dyed therein for 1 hour at 98°. After cooling, rinsing, soaping, further rinsing and drying, a deep yellow dyeing is obtained which is level and has notable fastness properties.

APPLICATION EXAMPLE B

30 Parts of the dye preparation prepared according to Example A are mixed well with 300 parts water. 600 Parts of a 4% aqueous solution of locust bean flour ether are added and the mixture is made up to 1000 parts with water.

The printing paste obtained is applied by a conventional printing process (roller, screen or rotary printing process) to an absorbent web of paper, approximately 15 kg. printing paste being used per 100 sq. m. paper. The printed paper is dried in a current of air heated to approximately 100°.

Transfer printing is carried out on a cylinder heated to 180° over which the printed paper, with the printed side facing away from the cylinder and covered by the web of polyester fabric, runs. The paper and the polyester web are left on the heated cylinder for 60 seconds during which time the dye is sublimed off the paper and penetrates into the polyester fibres. A transfer print with notable fastness properties is obtained.

Prints of high quality can also be obtained on material consisting of synthetic polyamides and cellulose acetates using the same process.

What is claimed is:

1. A styryl dye compound of formula I,

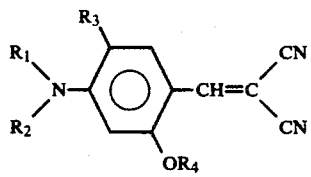

in which
R$_1$ signifies (C$_{1-6}$) alkyl or (C$_{5-6}$) cycloalkyl,
R$_2$ signifies (C$_{1-4}$) alkyl; or (C$_{1-4}$) alkyl monosubstituted by chlorine, bromine, phenyl, phenoxy, (C$_{1-4}$)alkoxy, (C$_{1-4}$)alkoxycarbonyl, (C$_{1-4}$)alkylcarbonyloxy, (C$_{1-4}$) alkoxycarbonyloxy or benzoyloxy,
R$_3$ signifies hydrogen and (C$_{1-6}$) alkylsulphonyl, (C$_{5-6}$) cycloalkylsulphonyl, benzylsulphonyl di-(C$_{1-4}$) alkylaminosulphonyl or N-(C$_{1-4}$) alkyl-N-phenylaminosulphonyl
any phenyl moiety in such substituents R$_2$ and R$_4$ being unsubstituted or substituted by up to two substituents selected from the group consisting of chlorine, bromine, methyl and methoxy, or monosubstituted by ethoxy.

2. A compound according to claim 1, in which R$_1$ signifies an alkyl radical.

3. A compound according to claim 2, in which R$_1$ signifies (C$_{2-4}$) alkyl.

4. A compound according to claim 3, in which R$_2$ signifies alkyl or alkyl monosubstituted by chlorine, bromine, methoxy, ethoxy, phenyl, phenoxy, acetoxy, propionyloxy, (C$_{1-4}$)alkoxycarbonyl or (C$_{1-4}$)alkoxycarbonyloxy.

5. A compound according to claim 3, in which R$_2$ signifies (C$_{2-4}$)alkyl; (C$_{2-4}$)alkyl monosubstituted by chlorine, bromine, methoxy, ethoxy, phenyl, phenoxy, acetoxy, propionyloxy, (C$_{1-4}$)alkoxycarbonyl or (C$_{1-4}$) alkoxycarbonyloxy; or benzyl.

6. A compound according to claim 5, in which R$_4$ signifies (C$_{1-4}$) alkylsulphonyl, (C$_{5-6}$) cycloalkylsulphonyl, dimethyl- or diethylaminosulphonyl or benzylsulphonyl.

7. A compound according to claim 6, in which R$_4$ signifies (C$_{1-4}$) alkylsulphonyl, cyclohexylsulphonyl, benzylsulphonyl, or dimethyl- or diethylamino- -sulphonyl.

8. A compound according to claim 7, of formula Ia,

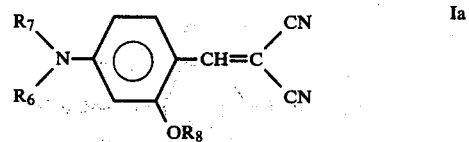

in which
R$_6$ signifies (C$_{2-4}$) alkyl,
R$_7$ signifies (C$_{2-4}$) alkyl which is unsubstituted or monosubstituted by (C$_{1-2}$)alkylcarbonyloxy, (C$_{1-2}$)alkoxycarbonyl or (C$_{1-2}$)alkoxycarbonyloxy,
R$_8$ signifies (C$_{1-4}$) alkylsulphonyl, cyclohexylsulphonyl, benzylsulphonyl, or di-(C$_{1-2}$) alkylaminosulphonyl.

9. A compound according to claim 8, in which R$_6$ signifies ethyl.

10. A compound according to claim 9, in which R$_7$ signifies an unsubstituted or substituted ethyl radical.

11. A compound according to claim 8, in which R$_7$ signifies unsubstituted (C$_{2-4}$) alkyl.

12. A compound according to claim 8, in which R$_8$ signifies (C$_{1-4}$)alkylsulphonyl, cyclohexylsulphonyl or benzylsulphonyl.

13. A compound according to claim 12, of formula Ib,

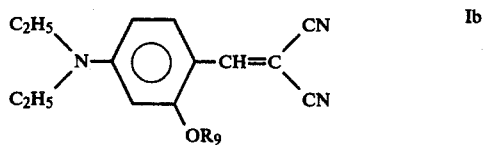

in which
R$_9$ signifies (C$_{1-4}$) alkylsulphonyl, cyclohexylsulphonyl, or benzylsulphonyl.

14. A compound according to claim 12, of formula,

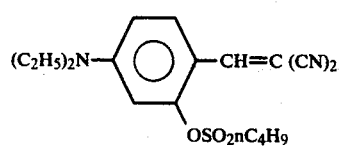

15. A compound according to claim 12, of formula,

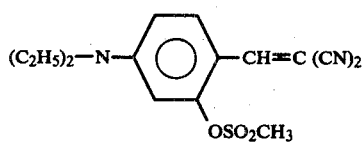
16. A compound according to claim 12, of formula,
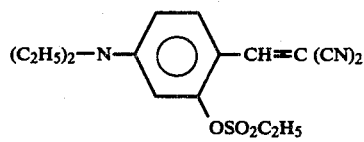
17. A compound according to claim 8, of formula,
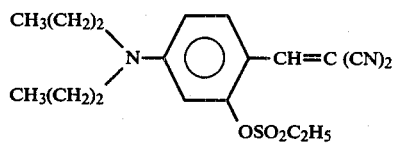
18. A compound according to claim 12, of formula,
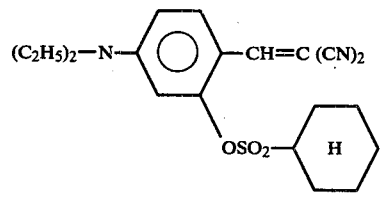
19. A compound according to claim 7 wherein $R_4$ is $(C_{1-4})$alkylsulphonyl, benzylsulphonyl or cyclohexylsulphonyl.
20. A compound according to claim 1 wherein
$R_1$ is alkyl and
$R_4$ is $(C_{1-4})$alkylsulphonyl, benzylsulphonyl or cyclohexylsulphonyl.
* * * * *

UNITED STATES PATENT AND TRADEMARK OFFICE
CERTIFICATE OF CORRECTION

PATENT NO. : 4,166,068
DATED : August 28, 1979
INVENTOR(S) : Werner Baumann/Ulrich Zirngibl It is certified that error appears in the above—identified patent and that said Letters Patent is hereby corrected as shown below:

Col. 9, Claim 1, line 8 after the formula;

after "and" insert --$R_4$ signifies--.

Signed and Sealed this

Sixteenth Day of September 1980

[SEAL]

Attest:

SIDNEY A. DIAMOND

Attesting Officer

Commissioner of Patents and Trademarks